United States Patent [19]

Sallas et al.

[11] Patent Number: 4,922,473
[45] Date of Patent: May 1, 1990

[54] ENCLOSURE FOR SUPPRESSION OF AIR-COUPLED NOISE PRODUCED BY SEISMIC VIBRATORS

[75] Inventors: John J. Sallas, Plano; Richard H. Luce, Garland; Michael A. Corrigan, Carrollton, all of Tex.

[73] Assignee: Halliburton Geophysical Services, Inc., Dallas, Tex.

[21] Appl. No.: 333,295

[22] Filed: Apr. 4, 1989

[51] Int. Cl.$^5$ .............................................. H04R 11/00
[52] U.S. Cl. ..................................... 367/189; 181/401
[58] Field of Search ............... 181/108, 113, 114, 121, 181/400, 401; 367/187, 190

[56] References Cited

U.S. PATENT DOCUMENTS 4,691,803  9/1987  Martin .................................. 181/113
4,712,641 12/1987  Chelminski ...................... 181/114 X
4,799,572  1/1989  Airhart ................................ 181/114

OTHER PUBLICATIONS

Press et al., Ground Roll Coupling to Atmospheric Compressional Waves, Geophysic 16, pp. 416–430.
Vertical Honeycomb, Application Data Sheet, 1970.
Vertical Honeycomb, Application Data Sheet, 1986, 1978.

Primary Examiner—Brian S. Steinberger

[57] ABSTRACT

Air wave noise caused by a vibrating baseplate on a seismic vibrator is reduced or eliminated through passive absorption of sound. In passive absorption, reduction of air wave noise is achieved by building a rigid, light-weight enclosure for the baseplate which remains isolated from the induced ground vibrations and nonresonant.

11 Claims, 2 Drawing Sheets

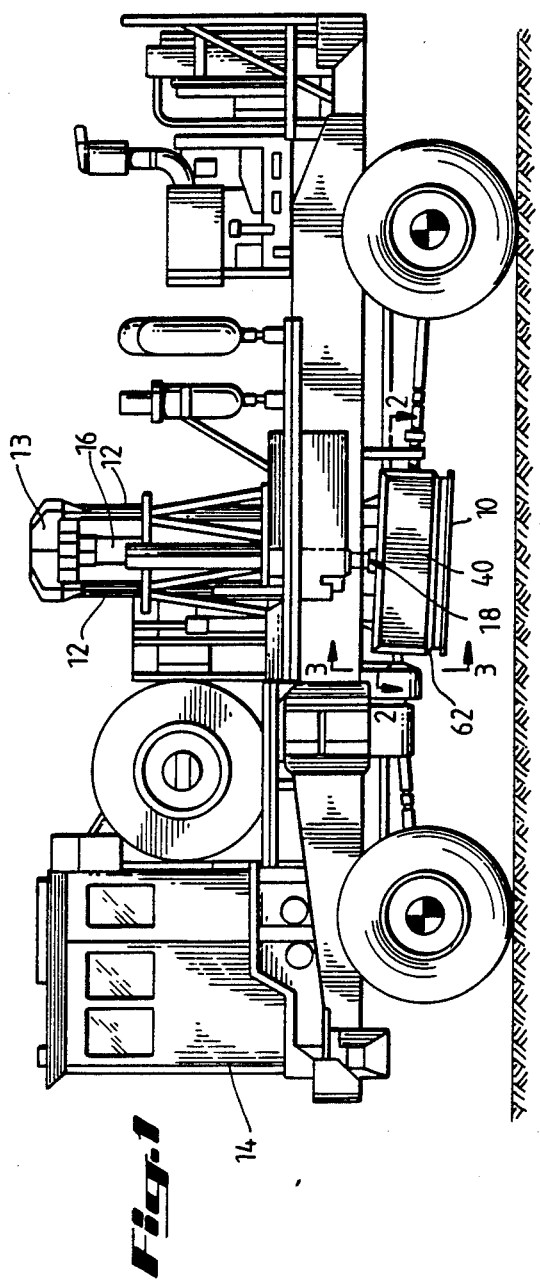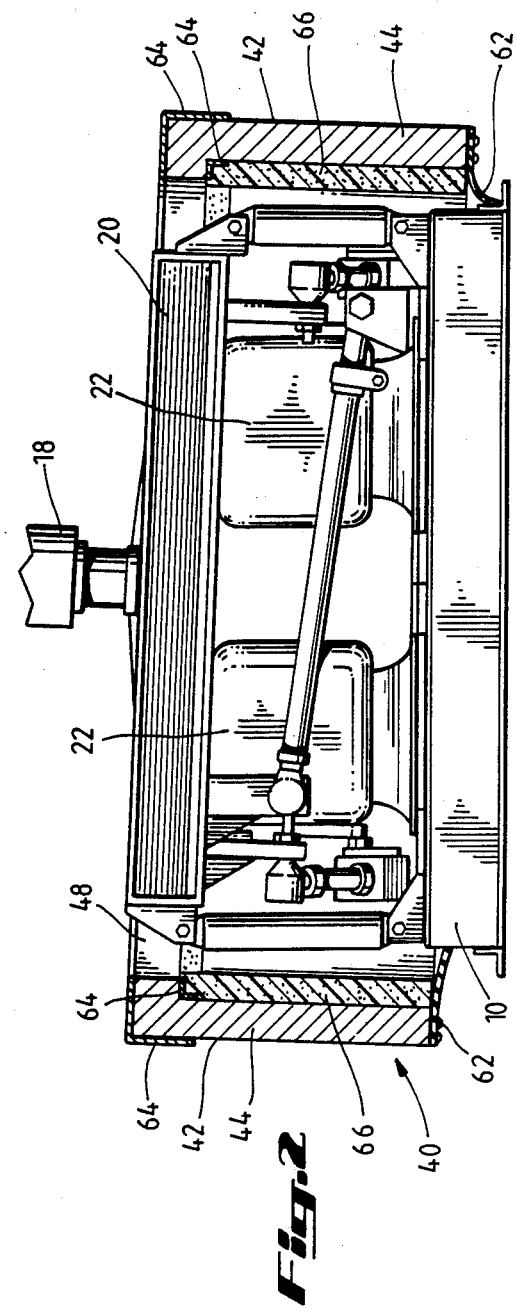

ENCLOSURE FOR SUPPRESSION OF AIR-COUPLED NOISE PRODUCED BY SEISMIC VIBRATORS

BACKGROUND OF THE INVENTION

This application relates to noise reduction methods; specifically, it relates to methods and apparatus for reducing unwanted sound waves produced by seismic vibration equipment.

Seismic Waves

Geophysical surveys to estimate the depth, shape, and composition of subterranean formations commonly use seismic vibrators to induce seismic waves, which may be detected using a number of sensitive instruments called geophones.

Seismic vibrators typically vibrate according to a controlled sweep of frequencies, usually starting at a very low frequency and ending at a high frequency. The vibrations produced take several forms; the pressure or "P" wave is the wave of greatest intensity at depth, traveling through the earth faster and at greater depths than other waves such as shear waves. Normally, the P-wave is of greatest interest in the mapping of rock formations.

Geophones, usually placed in an array or grid-like pattern on the surface of the earth or just beneath, are used to detect reflections of vibrations from rock strata. Measurement of the intensity and time delay of an arriving reflected wave at numerous locations allows the mapping of rock strata, and gives information about the thickness and composition of the layers.

The basic principle of seismic surveys is simple. Each of the rock layers underneath a seismic vibrator reflects the P-waves induced at the surface according to its contrast in acoustic impedance. For example, an interface in which a low impedance layer lies above a high impedance layer will reflect a large proportion of the incident wave; therefore, the reflected wave will be of greater amplitude.

Geophones typically record the amplitude of detected vibrations at a given time for later analysis. Determination of the number of layers, and their depths are made through comparison of the amplitude of the wave with the time at which the reflection arrived after the initial induced vibration. The time-delay for a reflected wave to arrive at a geophone is an indication of the depth from which the wave is reflected. As might be expected, time delay increases with depth.

Air-Coupled Waves

Air-coupled waves are coherent noise trains produced by a surface seismic source, propagating at the speed of sound in air. Air waves may be entirely coupled with the air, or, in the case of low frequency (6-8 Hz) waves, may be partially coupled with the near surface if the phase velocity of the Rayleigh wave and the speed of sound in air are the same. The latter has been described in Press and Ewing, "Ground Roll Coupling to Atmospheric Compressional Waves", Geophysics 16, pp. 416-30.

Seismic vibrators usually operate above ground, with the vibrational energy transmitted into the earth via a baseplate resting on the ground. In field surveys, it is common to make use of a vibrator mounted on a truck. Since the majority of the vibrator is exposed to the air, including the upper surface of the baseplate, some of the vibrational energy during operation is transmitted through the air as sound waves.

These air-coupled sound waves are often of sufficient intensity to disrupt or impair measurements. Geophones are calibrated to detect minuscule reflections of the initial P-wave; waves propagating through the air may cause slight vibrations of the geophones or of the ground itself, which are of relatively high amplitude, causing air-coupled waves to be recorded. Recording of the air-coupled waves can be of sufficient intensity to mask moderate depth reflection data. Because air wave noise can cause the ground to vibrate, burial or shielding of geophones fails to alleviate the problem.

Air wave noise is strongest at higher frequencies (i.e., 30 Hz and above); existing filtering techniques for removing Rayleigh waves have proven ineffective at such high frequencies because current geophone group spacing is too great and creates spatial aliasing problems. The effects of air wave noise may be suppressed through more closely spaced arrays of geophone elements; however, dramatically increasing the number of geophones used for a survey increases the cost and complexity of conducting a survey.

Sound Absorption

Prior attempts to passively attenuate the airwave have included enclosing either the baseplate or truck with canvas or other thin materials. These methods have provided very little attenuation. Because seismic methods involve much lower frequencies that those of concern in convential industrial sound reduction applications, traditional sound absorption materials such as fiberglass or polyurethane foams are ineffective for absorbing sound waves; adequate noise reduction using these materials would require inordinately thick layers.

SUMMARY OF THE INVENTION

In accordance with the invention, erroneous geophone readings due to air-coupled waves may be reduced or eliminated through containment and absorption of the waves.

Passive attenuation is achieved using a rigid, non-resonant structure which encloses the baseplate and is isolated from the vibrations of the baseplate and the ground.

BRIEF DESCRIPTION OF THE DRAWINGS

FIG. 1 depicts a truck having a seismic vibrator;

FIGS. 2 and 3 show the method of mounting a passive absorption baseplate enclosure according to the invention;

DETAILED DESCRIPTION OF SPECIFIC EMBODIMENTS

Figure 3:
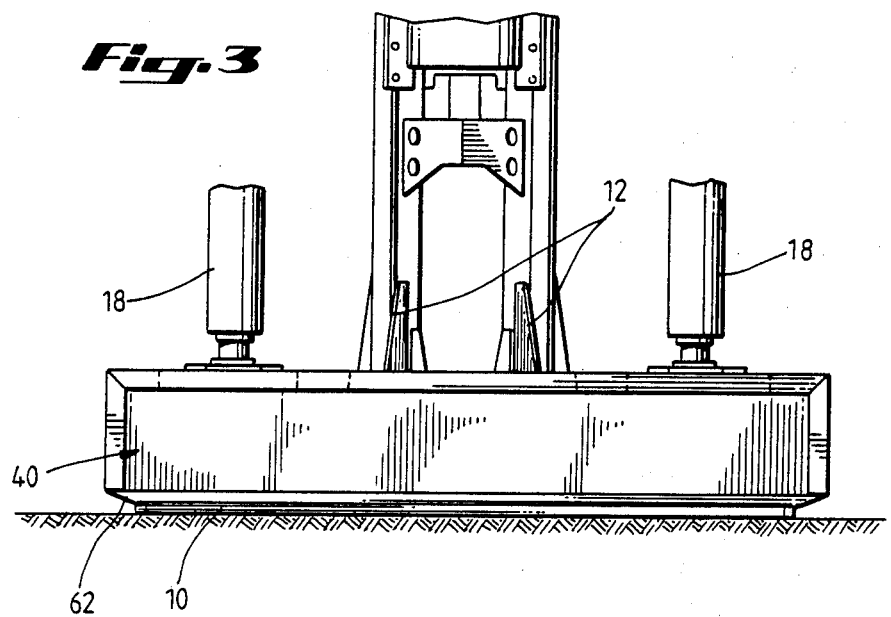

In seismic geophysical surveying, it is becoming increasingly common to use the Vibroseis method, in which the seismic vibrations are produced by using a vibrator in contact with the ground. This vibrator is operated in cycles in which the frequency of vibrationis swept through a range known to be advantageous for geophysical surveying, normally between about 5 Hz to about 150 Hz.

In field operations, a mobile vibrator mounted on a truck is used, of the type depicted in FIG. 1. Baseplate 10 is lowered so as to be in contact with the ground. Vibrations of controlled and varying frequency are imparted to the ground through baseplate 10 by means of the stilts 12 controlled by vibration mechanism 13. When the survey is completed, baseplate 10 is raised so that truck 14 can be moved to the next survey site.

Estimating Sound Pressure Levels

A simplistic model for estimating sound pressure levels caused by a vibrating baseplate is that of a rigid planar circular piston source, vibrating in an infinite, rigid baffle. All transmission is assumed through lossless air. For this model, the sound pressure p in pascals (Pa) generated by a piston of radius r oscillating at frequency w at an acceleration a, measured at an angle b from the normal and a distance d from the source (d>>r) may be described using the following equation:

$$p(w,t,r) = [r0 ar^2 J1(x) \exp \{j(wt-kd)\}]/dx$$

where r0 is the density of air, k is the wave number, J1 is a Bessel function of the first kind of order 1; and x=kr sin (b). This equation is derived in P. M. Morse (1948). For horizontal propagation of energy, the angle b is 90 degrees.

The model described above is simplistic, and ignores several factors which must be taken into account. First, the baseplate is not typically circular, but rectangular in shape. A typical baseplate is four feet wide by eight feet long. (For purposes of comparison to the model, a circular baseplate of comparable area would be three feet in radius.)

In the model, the vibrating baseplate is assumed rigid; however, measurements of representative baseplates has shown phase and amplitude differences between different points on a baseplate for frequencies as low as 50 Hz. As frequency increases, the outer portion of the baseplate experiences greater acceleration than the center, and lags behind the center region in phase. One test yielded a 40 degree phase shift and amplitude variation of 8 dB for a frequency of 100 Hz.

Strictly speaking, the reaction mass 16 shown in FIG. 1 (which imparts force to the baseplate 10) contributes to air wave generation. However, studies of the waves generated have shown that the mass produces waves as a dipole with one element above the other, and the two elements in anti-phase. Since the air waves of concern here are the waves propagating horizontally toward geophones placed at a distance, the effects of the reaction mass 16 may be ignored.

Baseplate acceleration generally increases with frequency at the low end of the seismic band (below 20 Hz); as a result, air wave production also increases with increasing frequency. Above 30 Hz or above ground resonance, the baseplate acceleration generally levels off. Measurements indicate air wave pick-up at the geophones usually attains a maximum in the 60-100 Hz frequency range.

Passive Absorption of Air Waves

Passive suppression of air waves may be accomplished by enclosing baseplate 10 in cabinet 40 as shown in FIGS. 2 and 3. Cabinet 40 is attached to a movable footpiece 20, and is vibrationally isolated from the baseplate and ground, preferably using air bags 22. In this preferred embodiment, the enclosure is free to move with lift system 18 used to raise and lower the baseplate. The cabinet is lowered together with the baseplate when sweeping (imparting vibrational energy to the ground), and raised with the baseplate when moving the vibrator to the next position. Cabinet 40 could alternatively be attached to the frame of the truck.

It is not possible to make cabinet 40 from conventional sound-absorbing materials, such as fiberglass or polyurethane foam, because the thickness required of such materials to adequately attenuate the low frequency vibrations of concern means that the cabinet is too heavy to be readily lifted, and too bulky to fit onto typical seismic vibrator trucks as shown in FIG. 1.

The applicants have discovered that effective attenuation below 100 Hz can be achieved by making cabinet 40 of a rigid material, such as steel-framed plywood lined with a sound-absorbing layer. Preferably, to achieve lightness as well as rigidity, cabinet 40 is constructed of a composite material consisting of a lightweight core sandwiched between metal or plywood skins. A suitable material is "Verticel" honeycomb, available from The Verticel Co. of Brylewood, Colo.

Figure 4:
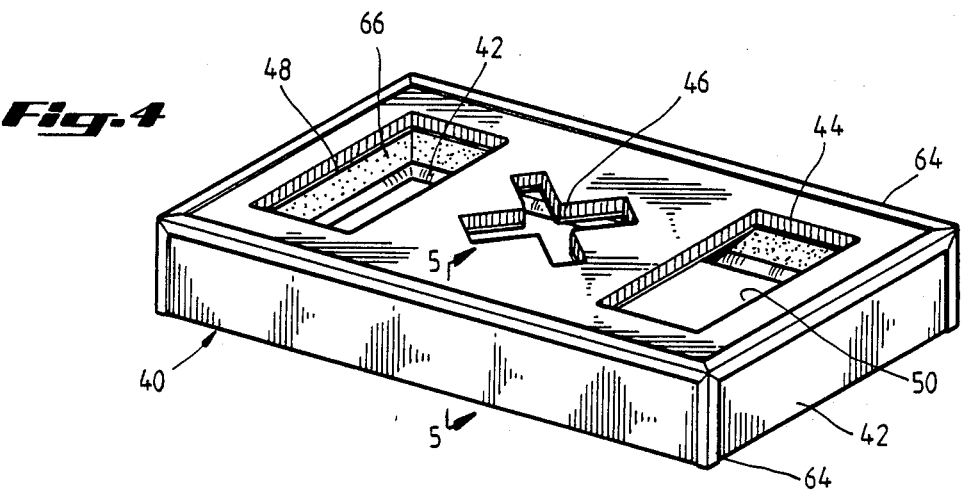
FIG. 4 depicts the passive absorption baseplate enclosure before mounting.
Figure 5:
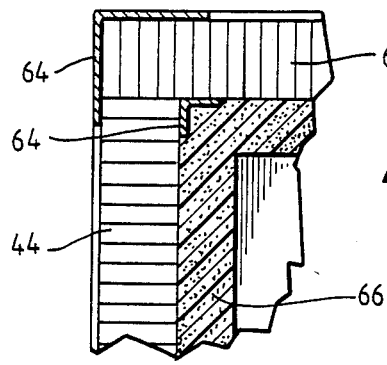
FIG. 5 is a cross-section through part of an enclosure showing construction details.

Details of the construction of cabinet 40 are shown in FIGS. 4 and 5. In the preferred embodiment, the sides of cabinet 42 are made from two-inch thick Verticel honeycomb 44, secured at the edges on both the outside and the inside with aluminum angle strips 64.

Preferably, the interior of cabinet 40 is lined with sound-absorbing material 66. In the preferred embodiment, the sound-absorbing material 66 is a thin lead sheet sandwiched between foam layers, a thinner foam layer for attachment to the walls of cabinet 40 and a thicker layer, preferably two inches thick, facing the interior of cabinet 40 for sound absorption. A suitable material is "Soundcontrol Mat" manufactured by E. N. Murray Co. of Denver, Colo.

Cabinet 40 is sealed to baseplate 10 by means of a flexible barrier, such as a heavy neoprene seal 62. The cabinet is preferably made in several pieces for ease of installation. A cutout 46 is the top of cabinet 40 allows the vibrator stilts 12 to pass through. Gaps are sealed with sound control material and a flexible seal. Cutouts for attaching cabinet 40 to the footpieces 20 and the vibrator lift system 18 are shown at 48 and 50.

The disclosed invention is not limited to the preferred embodiment described above. It will be apparent to those of ordinary skill in the art that various modifications may be made to the described embodiment that come within the scope of the appended claims.

What is claimed is:

1. Apparatus for suppressing the propagation of sound waves in air resulting from the vibration of a baseplate on a seismic vibrator, said baseplate having a predefined perimeter surface, comprising:
    (a) a substantially rigid sound reducing enclosure surrounding at least an upper portion of the baseplate;
    (b) means for flexibly sealing the sound reducing enclosure to the predefined perimeter surface of the baseplate;
    (c) means for vibrationally isolating the sound reducing enclosure from the baseplate; and
    (d) means for vibrationally isolating the sound reducing enclosure from the ground.

2. Apparatus for suppressing the propagation of sound waves in air as claimed in claim 1, further comprising a sound absorbing lining for the sound reducing enclosure.

3. Apparatus for suppressing the propagation of sound waves in air as claimed in claim 1, wherein the sound reducing enclosure is made from plywood.

4. Apparatus for suppressing the propagation of sound waves in air as claimed in claim 1, wherein the sound reducing enclosure is made from a substantially rigid composite material comprising a lightweight core sandwiched between two relatively rigid layers of material.

5. An apparatus for suppressing the propagation of sound waves in air resulting from the vibration of a baseplate of a seismic vibrator, comprising:
 a substantially rigid enclosure encompassing at least a top portion of said baseplate, and being substantially isolated from vibrations of said baseplate; and
 a layer of sound absorbing material disposed on selected interior portions of said enclosure.

6. The apparatus, as set forth in claim 5, further comprising:
 a flexible seal extending between said enclosure and said baseplate, said seal allowing said baseplate to vibrate relative to said enclosure and further suppressing propagation of sound waves in air resulting from vibration of said baseplate.

7. The apparatus, as set forth in claim 5, wherein said layer of sound absorbing material comprises:
 a support sheet having two opposed sides, each of said sides being coated with a layer of foam.

8. An apparatus for suppressing the propagation of sound waves in air resulting from the vibration of a baseplate of a seismic vibrator, said baseplate having a predefined perimeter, said apparatus comprising:
 a substantially rigid enclosure mounted onto said seismic vibrator to allow said baseplate to vibrate relative to said enclosure, said enclosure encompassing at least a top portion of the perimeter of said baseplate;
 a layer of sound absorbing material disposed on selected interior portions of said enclosure; and
 a flexible seal extending between said enclosure and the perimeter of said baseplate.

9. The apparatus, as set forth in claim 8, wherein said layer of sound absorbing material comprises:
 a support sheet having two opposed sides, each of said sides being coated with a layer of foam.

10. A method of suppressing the propagation of sound waves in air resulting from the vibration of a baseplate of a seismic vibrator, comprising the steps of:
 surrounding at least an upper portion of said baseplate with a substantially rigid enclosure having a layer of sound absorbing material disposed on selected interior portions thereof; and
 isolating said enclosure from vibrations produced by said baseplate.

11. A method of suppressing the propagation of sound waves in air resulting from the vibration of a baseplate of a seismic vibrator, said baseplate having a predefined perimeter surface, comprising the steps of:
 surrounding at least an upper portion of said baseplate with a substantially rigid enclosure having a layer of sound absorbing material disposed on selected interior portions thereof;
 isolating said enclosure from vibrations produced by said baseplate; and
 flexibly sealing said enclosure to the perimeter surface of said baseplate.

* * * * *

UNITED STATES PATENT AND TRADEMARK OFFICE
CERTIFICATE OF CORRECTION

PATENT NO. : 4,922,473

DATED : May 1, 1990

INVENTOR(S) : John J. Sallas et al

It is certified that error appears in the above-identified patent and that said Letters Patent is hereby corrected as shown below:

In column 2, line 7, delete [geophones] and insert therefore --geophone--.

In column 2, line 63, delete [vibrationis] and insert therefore --vibration is--.

In column 3, line 21, delete [kr] and insert therefore --k r--.

Signed and Sealed this

Seventeenth Day of December, 1991

Attest:

HARRY F. MANBECK, JR.

*Attesting Officer*     *Commissioner of Patents and Trademarks*